United States Patent [19]

Abe

[11] 3,964,316

[45] June 22, 1976

[54] WAVE MOTION SIMULATOR

[75] Inventor: Kyoichi Abe, Chula Vista, Calif.

[73] Assignee: Rohr Industries, Inc., Chula Vista, Calif.

[22] Filed: Dec. 23, 1974

[21] Appl. No.: 535,504

[52] U.S. Cl. .............................. 73/432 SD; 73/12; 73/148; 73/159
[51] Int. Cl.² .................. G01M 10/00; B63B 9/08; G01N 3/32
[58] Field of Search .............. 73/12, 100, 148, 161, 73/432 R, 432 SD, 1 DV, 1 E, 71.5 R, 87, 102, 159

[56] References Cited

UNITED STATES PATENTS

| | | | |
|---|---|---|---|
| 2,327,829 | 8/1943 | Sternberg et al. | 73/161 X |
| 2,683,368 | 7/1954 | McDowell | 73/12 |
| 3,706,222 | 12/1972 | Smith et al. | 73/100 X |

Primary Examiner—Richard C. Queisser
Assistant Examiner—John S. Appleman
Attorney, Agent, or Firm—Patrick J. Schlesinger; Frank D. Gilliam

[57] ABSTRACT

An apparatus to generate a wave-like pattern of forces on a surface effect ship utilizes a flexible membrane which undulates in a water wave-like manner, the crests of the waves transferring forces to the surface effect ship. The membrane is undulated in its sine wave configuration by means of a series of linkages, one link of which is pinned to the underside of the membrane. That link is reciprocally actuated and the combined movements of the various linkages cause the membrane to undulate as would water waves. The main drive motor drives a primary shaft to which are connected a series of gear boxes which in turn drive secondary drive shafts. By controlling or varying the speed of the primary drive motor, the frequency of the generated waves may be varied. At each linkage station there is a crank and the connecting rod is adjustably connected to the crank. The amplitude of the waves can be varied as desired by adjustably positioning the connecting rod along the crank.

18 Claims, 2 Drawing Figures

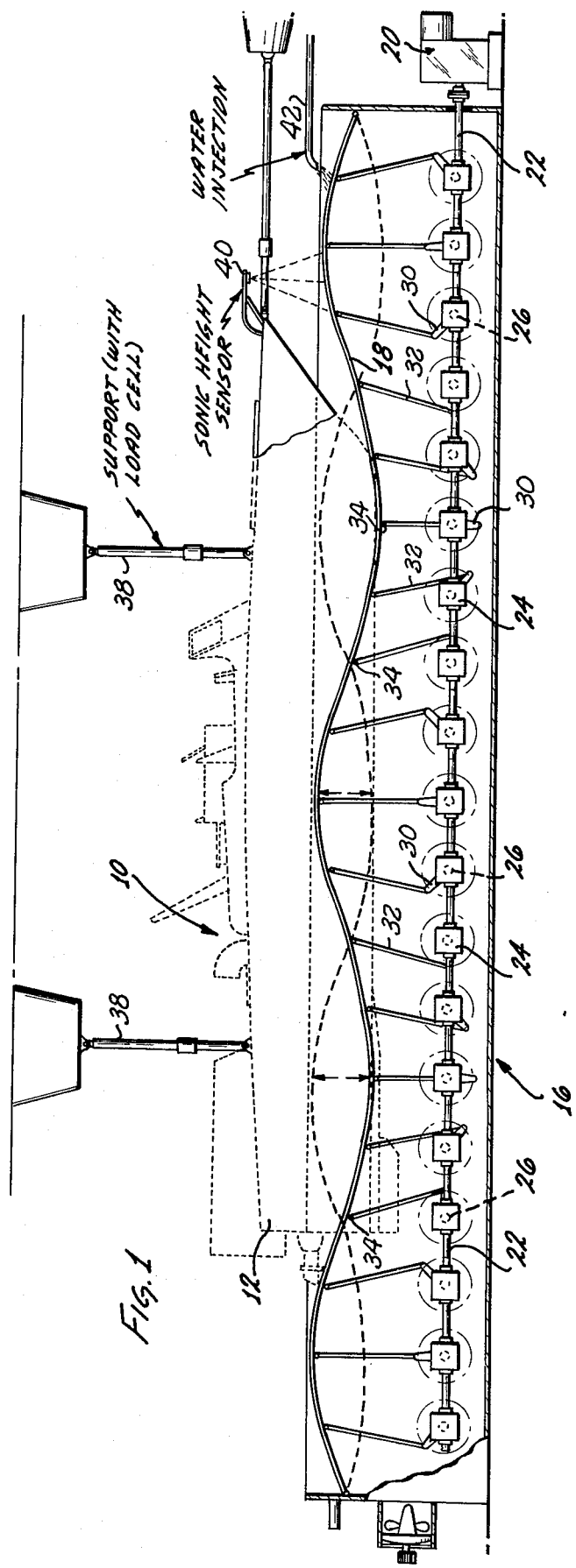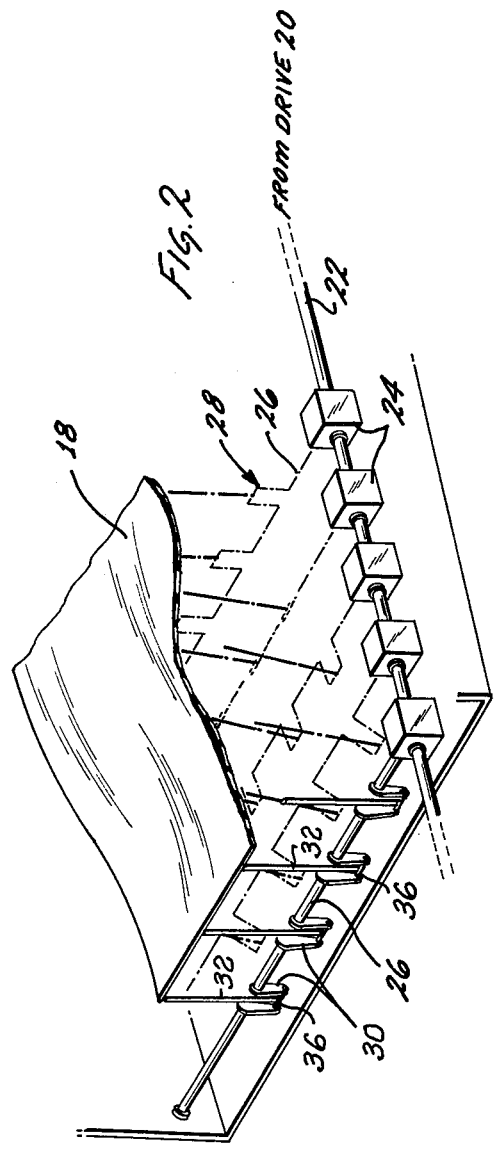

WAVE MOTION SIMULATOR

BACKGROUND OF THE INVENTION

The present invention relates to a wave motion simulator which is designed to impart forces to a surface effect ship so that the habitability limits of that ship can be determined without having to place the ship in the water to make similar tests.

The latest generation of naval ships promises to be of the surface effect type. Those ships are capable of exceptionally high speed in the vicinity of 80 to 90 knots, and in general will operate on an air bubble between themselves and the surface of the water. Ships of that type are presently in the developmental stage but in the near future promise to become a significant part of the naval fleets of the United States. It is also considered that the ships have a future in commercial uses both as cargo carriers and as cruise ships.

Due to the high speed of these ships, excessive and sometimes damaging wave shocks are encountered and at the present many different schemes have been presented and are being studied which would attenuate the force of the waves on the ships. Since these ships will travel at or in excess of 80 knots, the forces that they will encounter are so excessive that a tremendous amount of developmental work remains to be accomplished. The present invention permits ships of various designs to be tested for habitability and performance characteristics without the expense and bother of having the ship placed in the water. In the first place, a ship must be completely prepared before it can be tested in the water, and secondly, a ship that can be tested on land need not be completed in all respects to get meaningful data regarding the reaction to wave shock. The instant invention permits surface effect ships to be tested in various phases of design so that problems or weaknesses may be corrected before proceeding with the next production aspect of the vessel. Utilization of the instant invention will at least make the developmental stage of the prototypes less expensive since the cost of transporting and immersing the vessel is not inconsiderable.

SUMMARY OF THE INVENTION

The preferred embodiment of the wave motion simulator of the instant invention is characterized by an apparatus that generates wave-like patterns of forces on the underside of a surface effect ship. The apparatus comprises a flexible membrane on which the ship rests, and includes a power driven mechanism for undulating the membrane in a manner resembling the natural motion of water waves.

The object of this invention is to provide an accurate and inexpensive means for the dynamic testing of the various design parameters of a ship of the type described, thus eliminating the need for large and expensive test tanks and their supporting equipment and trial-and-error construction methods.

The above object and other features of the instant invention will be readily apparent as the description continues while being read in conjunction with the appended drawings.

BRIEF DESCRIPTION OF THE DRAWINGS

FIG. 1 is a partially diagramatic view of the undulating apparatus.

FIG. 2 is a perspective cut-away view of the simulation apparatus illustrating the linkages in their respective positions which in combination undulate the membrane in a sine wave-like manner.

DETAILED DESCRIPTION

FIG. 1 illustrates a surface effect ship 10 that is finding widespread use for various naval purposes. That ship is characterized by side walls 12, on each side of the hull which define a cavity therebetween through which the water waves pass. The propulsive systems of the vessel are not shown but in general it may be thought to consist of turbines or other like motors which are capable of forming an air cushion between the underside of the vessel and the water so that in effect the boat rides above the water on an air cushion, and contacts only those waves which are high enough above the waterline to make contact with the vessel. These waves are incident on the bow of the ship which is usually fitted with some kind of cushioning device to somewhat attenuate the shock transferred to the boat. The cushioning device is sometimes included with trailing fingers which have the effect of contouring the waves so that the effect on the boat can to some degree be controlled and so as to better approximate a sine wave, the amplitude of the wave being no higher than the underside of the vessel.

The simulation device 16 is a self-contained unit and the vessel 10 is placed over that unit such that the side walls 12, overlap the sides of the simulation device 16. The simulation device is characterized by a membrane 18 which is approximately as long and as wide as the device 16 and that membrane is flexible so as to be readily undulated into a wave-like pattern so as to impart forces onto the underside of the vessel 10.

A drive motor 20 may be of a conventional nature and may be located externally of the simulation device 16. That drive motor drives a primary drive shaft 22 which extends the entire length of the simulation device 16. At a multiplicity and regularly spaced number of stations along the primary drive shaft 22, are located a series of gear boxes 24. Those gear boxes are of a conventional type and form no separately unique inventive entity. As primary function of the gear boxes is to transfer the motion of shaft 22 to the transverse secondary shafts 26. As shown in FIG. 2, the secondary shafts 26 are driven by the gear boxes 24 and since the gear boxes are adapted for 90° rotational transference, the motion of the primary shaft 22 is transferred into rotational motion of the secondary shaft 26.

Along each secondary shaft 26 are stationed a series of regularly spaced linkages 28 which linkages are driven by the secondary shaft 26. The linkages each comprise a "U" shaped member 30 and a connecting rod 32. The connecting rod is penned at 34 to the membrane and may be journaled on the small cross-shaft 36. All the connecting rods driven by the secondary shafts 26 move in unison. The position of the U member 30 in each row is staggered with respect to the position of the members in adjacent rows. It should be evident that the net effect of the connecting rods on the membrane 18 is to undulate it in a sine-wave pattern. Naturally, the speed at which the primary motor 20 is driven will determine the frequency of the generated waves, a greater speed causing a higher frequency. The amplitude of the waves may be controlled via an adjustable connection between the connecting rod 32 and the small cross-shaft 36. It is also possible that the connecting rod 32 might be telescopically entensible and contractable.

The apparatus characterizing the instant invention contemplates a support 38 with a variable load cell to impart a desired load in the membrane. The apparatus, furthermore, includes a sonic sensor 40 which detects the position of a point on the membrane at all times. Additionally, water injection 42 is included for better conformance to normally encountered operating conditions.

The apparatus herein described permits effective data gathering relating to habitability evaluations of surface effect ships and the like. Expensive moded or prototype testing is avoided permitting close control of the design of the craft.

Many changes may be made in details of the instant invention, in the method and materials of fabrication, in the configuration and assemblage of the constituent elements, without departing from the spirit and scope of the appended claims, which changes are intended to be embraced therewithin:

I claim:

1. Apparatus to generate a wave-like pattern of forces on the underside of a surface-effect ship which comprises a flexible membrane activated to simulate water waves, the crests of said waves active on the underside of said ship to transfer forces thereto, and means to undulate said membrane.

2. In the apparatus of claim 1, said membrane is undulated in sine-wave configurations.

3. In the apparatus of claim 1, said undulating means includes means to vary the frequency of said waves.

4. In the apparatus of claim 1, said undulating means include means to vary the amplitude of said waves.

5. In the apparatus of claim 4, said undulating means includes means to vary the frequency of said waves.

6. Apparatus to generate a wave-like pattern of forces on the underside of a surface effect ship which comprises a flexible membrane activated to simulate water waves, the crests of said waves active on the underside of said ship to transfer forces thereto, and undulating means to undulate said membrane, said undulating means comprising a drive motor, drive shaft means extending the length of the membrane and a plurality of linkage means interconnecting said drive shaft means and said flexible membrane.

7. In the apparatus recited in claim 6, wherein said drive shaft means comprises a primary drive shaft and secondary drive means positioned at specified stations along said primary drive shaft.

8. In the apparatus recited in claim 7 wherein the secondary drive means comprises a plurality of gear box means and a plurality of linkage means, one link of which extends to and is connected to the underside of said membrane, said one link is rotatably driven about said secondary drive means in such a manner to move the membrane, at its point of contact, in a predetermined reciprocal motion.

9. In the apparatus of claim 7 said secondary drive means comprises secondary drive shafts extending across the width of said membrane and said secondary drive shafts are driven by said primary drive shaft, and gear box means to transfer the motion of said primary drive shaft to said secondary drive shafts.

10. In the apparatus of claim 9 a plurality of said linkages are stationed at predetermined positions along said secondary shafts.

11. In the apparatus of claim 10 all said linkages on each of said secondary shafts move with similar motion.

12. In the apparatus of claim 8 said linkage means at each station comprise a crank and a connecting rod.

13. In the apparatus of claim 12 said connecting rod is adjustably connected to said crank, whereby, the amplitude of the waves can be varied.

14. Apparatus to generate a wave-like pattern of forces on the underside of a surface effect ship which comprises a flexible membrane activated to simulate water waves, the crest of said waves active on the underside of said ship to transfer forces thereto, and means to undulate said membrane and further comprising a water injection system means for injecting water between the upper surface of said membrane and said underside of said ship.

15. Apparatus to generate a wave-like pattern of forces on the underside of a surface effect ship which comprises a flexible membrane activated to simulate water waves, the crests of said waves active on the underside of said ship to transfer forces thereto, and means to undulate said membrane and further comprises a sonic height sensor means for detecting the position of a portion of said membrane during undulation thereof.

16. Apparatus to generate a wave-like pattern of forces on the underside of a surface effect ship which comprises a flexible membrane activated to simulate water waves, the crests of said waves active on the underside of said ship to transfer forces thereto, and means to undulate said membrane and further comprises a vehicle support means for imparting a selected vehicle load on said membrane.

17. Apparatus to generate a wave-like pattern of forces on the underside of a surface effect ship which comprises a flexible membrane activated to simulate water waves, the crests of said waves active on the underside of said ship to transfer forces thereto, and means to undulate said membrane, said undulating means includes means to vary the frequency of said waves, said undulating means comprises a drive motor and a primary drive shaft extending the length of the membrane, a series of secondary drive means positioned at specified stations along the primary drive shaft, and the secondary drive means comprises a plurality of gear box means and a plurality of linkage means, one link of which extends to and is connected to the underside of said membrane and said one link is rotatably driven about said secondary drive means in such a manner to move the membrane at its point of contact, in a predetermined reciprocal motion.

18. Apparatus to generate wave-like pattern of forces on the underside of a surface effect ship which comprises a flexible membrane activated to simulate water waves, the crests of said waves active on the underside of said ship to transfer forces thereto, means to undulate said membrane comprising a plurality of shafts each having a series of linkage means connected to said membrane at preselected points and each said series similarly acting on said membrane along a common line thereof, the entire membrane simulating water waves at a preselected sine-wave frequency and configuration and means for providing motion to said shafts.

* * * * *